US006967452B2

(12) United States Patent
Aiso et al.

(10) Patent No.: US 6,967,452 B2
(45) Date of Patent: Nov. 22, 2005

(54) OPERATION APPARATUS WITH AUTO CORRECTION OF POSITION DATA OF ELECTRIC FADERS

(75) Inventors: Masaru Aiso, Hamamatsu (JP); Takahisa Kageyama, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/716,044

(22) Filed: Nov. 17, 2003

(65) Prior Publication Data

US 2004/0104703 A1 Jun. 3, 2004

(30) Foreign Application Priority Data

Nov. 28, 2002 (JP) ............................ 2002-345686

(51) Int. Cl.[7] ................................................ G05D 3/12

(52) U.S. Cl. .......................... 318/466; 318/691; 318/2; 318/467; 318/469; 381/104; 381/109; 381/119; 381/120

(58) Field of Search ................................ 318/466, 652, 318/119, 3, 467, 469, 691, 2; 381/104, 109, 381/119, 120

(56) References Cited

U.S. PATENT DOCUMENTS

| | | | | |
|---|---|---|---|---|
| 4,479,240 | A * | 10/1984 | McKinley, Jr. | 381/80 |
| 4,631,525 | A * | 12/1986 | Serravalle, Jr. | 341/11 |
| 4,677,674 | A * | 6/1987 | Snyder | 381/58 |
| 5,054,077 | A * | 10/1991 | Suzuki | 381/109 |
| 5,122,720 | A * | 6/1992 | Martinson et al. | 318/663 |
| 5,239,458 | A * | 8/1993 | Suzuki | 700/83 |
| 5,243,513 | A * | 9/1993 | Peters | 700/83 |
| 5,293,102 | A * | 3/1994 | Martinson et al. | 318/2 |
| 5,479,519 | A * | 12/1995 | Davis | 381/119 |
| 6,153,994 | A * | 11/2000 | Royer et al. | 318/466 |
| 6,259,793 | B1 * | 7/2001 | Washio et al. | 381/119 |
| 6,264,355 | B1 * | 7/2001 | Ives et al. | 700/85 |
| 6,434,242 | B2 * | 8/2002 | Yamada et al. | 381/119 |
| 6,442,281 | B2 * | 8/2002 | Sato et al. | 381/102 |
| 6,763,177 | B1 * | 7/2004 | Abe et al. | 386/55 |
| 6,813,530 | B1 * | 11/2004 | Ives et al. | 700/94 |
| 6,839,441 | B1 * | 1/2005 | Powers et al. | 381/119 |
| 2002/0014867 | A1 * | 2/2002 | Callahan | 315/312 |
| 2002/0159375 | A1 * | 10/2002 | Eguchi et al. | 369/91 |

* cited by examiner

*Primary Examiner*—Rita Leykin
(74) *Attorney, Agent, or Firm*—Morrison & Foerster LLP

(57) ABSTRACT

An operation apparatus is designed for use with a system to deal with operation information of the system. In the operation apparatus, an operation piece is manually operable to move in a linear or circular direction to a position indicative of the operation information. A detection section detects the position of the operation piece and outputs position data corresponding to the detected position. A drive section responds to position data inputted from the system to automatically move the operation piece to a position corresponding to the inputted position data. An acquiring section provisionally acquires a plurality of reference position data which are outputted from the detection section when the operation piece is placed at a plurality of reference positions such that the respective reference position data correspond to the respective reference positions. A correcting section corrects the position data outputted from the detection section according to the provisionally acquired reference position data and outputs the corrected position data to the system.

22 Claims, 4 Drawing Sheets

OPERATION APPARATUS WITH AUTO CORRECTION OF POSITION DATA OF ELECTRIC FADERS

BACKGROUND OF THE INVENTION

1. Technical Field of the Invention

The present invention relates to a fader position detection apparatus and a fader position control apparatus. More specifically, the present invention relates to a technology capable of accurately acquiring position data and moving a sliding piece of the fader to a target position despite a variance of accuracy of the electric fader's variable resistor and despite a variance of mounting positions of the faders on an operation panel.

2. Prior Art

Conventionally, an audio system such as a digital mixer often uses an operation panel containing an electric fader to set various parameter values (e.g., see patent document 1). The electric fader has a variable resistor that moves in interlock with a sliding piece. When the sliding piece is manually operated, its operated position is detected as a voltage value or a current value that varies with a resistance value of the variable resistor. An A/D converter converts the voltage value or current value into a digital value. The converted value is supplied as position data to a system CPU that controls the digital mixer. The CPU converts the supplied position data into an attenuation factor and saves it in a current memory. The CPU then supplies the attenuation factor to a DSP (digital signal processor) in a signal processing section of the digital mixer. During the mixing process of audio signals, the DSP controls attenuation factors of each channel corresponding to each fader in accordance with the supplied attenuation factor value.

The electric fader has a motor drive section for setting the sliding piece to a specified position. For example, the digital mixer stores setting data as a scene for mixing audio signals including each attenuation factor of each channel. Some digital mixers have a function of recalling (invoking) the scene to resume the specified state of mixing. When the scene is recalled, the CPU reads the setting data (including the attenuation factors) for the scene, and copies it to the current memory. The sliding piece of the corresponding fader is electrically moved to a specified position so that the sliding piece position matches a position corresponding to the attenuation factor value. The same applies to the automix function that automates all mixing operations. When a fader moving event is reproduced at a specified timing according to the time stamp during auto-mix reproduction, the fader's sliding piece is electrically moved to a position corresponding to the attenuation factor specified by that event.

The electric fader is provided with a mechanism to turn off the electrical driving when a user manually commences operation of the fader's sliding piece while it is driven electrically.

The above mentioned Patent document 1 is Japanese Patent Publication No. 2684808

The conventional electric fader is subject to a variance of variable resistor accuracies and, therefore, subject to a variance of operation positions to be detected. Since resistance changes are uneven depending on positions of the fader's variable resistor, for example, this may degrade the linearity of detected fader positions. The fader is provided with a scale of graduations such as 0 dB and −10 dB to indicate the current position of the sliding piece. Positioning the sliding piece to a particular graduation does not necessarily provide an accurate attenuation factor indicated by the graduation, since there is always a mechanical error.

Further, it is possible to provide a plurality of faders with the same attenuation factor and electrically drive the sliding pieces so as to be moved to the position corresponding to the same attenuation factor. In this manner, the sliding pieces of the faders should all align to the same position horizontally. However, there have been cases where the sliding pieces of the faders are misaligned due to variable resistor errors of the faders. On the other hand, even if sliding pieces of the adjacent faders are manually adjusted to the same position, the faders do not necessarily generate the same attenuation factor due to possible errors.

When the operation panel of the digital mixer system is repaired to replace a faulty fader, a replaced new fader must conform to the characteristics of the other faders. Otherwise, the above-mentioned problems occur. Further, the replacement fader must be precisely aligned to the mounting position.

SUMMARY OF THE INVENTION

The present invention has been made in consideration of the foregoing. It is therefore an object of the present invention to acquire accurate position data corresponding to displayed scale of graduations and electrically move a sliding piece of the fader to a precise target position corresponding to the displayed graduations despite variances of electric fader accuracies and mounting positions. It is another object of the present invention to eliminate the need for selecting a suitable fader conforming to characteristics of the other faders during replacement and the need for precisely aligning a fader to the mounting position.

In order to achieve the above object, an inventive operation apparatus is designed for use with a system to deal with operation information of the system. The inventive operation apparatus comprises an operation piece manually operable to move in a linear or circular direction to a position indicative of the operation information, a detection section that detects the position of the operation piece and outputs position data corresponding to the detected position, an acquiring section that provisionally acquires a plurality of reference position data which are outputted from the detection section when the operation piece is placed at a plurality of reference positions such that the respective reference position data correspond to the respective reference positions, and a correcting section that corrects the position data outputted from the detection section according to the provisionally acquired reference position data and outputs the corrected position data to the system.

In a specific form, the operation apparatus for use with a system to deal with operation information of the system, comprises an operation piece manually operable to move in a linear or circular direction to a position indicative of the operation information, a detection section that detects the position of the operation piece and outputs position data PD corresponding to the detected position, a first acquiring section that provisionally acquires first reference position data $a_i$ which is outputted from the detection section when the operation piece is placed at a first reference position, and that provisionally acquires second reference position data $a_{i+1}$ which is outputted from the detection section when the operation piece is placed at a second reference position, a second acquiring section that acquires first correct position data $b_i$ which is predetermined in correspondence to the first reference position and acquires second correct position data $b_{i+1}$ which is predetermined in correspondence to the second reference position, and that calculates a coefficient $C_i$ according to the following first equation $C_i=(b_{i+1}-b_i)/(a_{i+1}-a_i)$, and a correcting section that operates when the position data PD falls between the first reference position data $a_i$ and the second reference position data $a_{i+1}$ for correcting the position data PD outputted from the detection section according to the following second equation and outputting the corrected position data CPD to the system, where the second equation is $CPD=b_i+C_i\times(PD-a_i)$.

In another aspect, an inventive operation apparatus for use with a system to deal with operation information of the system, comprises an operation piece manually operable to move in a linear or circular direction to a position indicative of the operation information, a detection section that detects the position of the operation piece and outputs position data corresponding to the detected position, a drive section responsive to target position data inputted from the system to automatically move the operation piece to a target position corresponding to the inputted target position data, an acquiring section that provisionally acquires a plurality of reference position data which are outputted from the detection section when the operation piece is placed at a plurality of reference positions such that the respective reference position data correspond to the respective reference positions, and a converting section that converts the target position data inputted from the system according to the respective reference position data, and outputs the converted target position data effective to enable the drive section to accurately place the operation piece at the target position.

In a specific form, the inventive operation apparatus for use with a system to deal with operation information of the system, comprises an operation piece manually operable to move in a linear or circular direction to a position indicative of the operation information, a detection section that detects the position of the operation piece and outputs position data corresponding to the detected position, a drive section responsive to target position data TPD inputted from the system to automatically move the operation piece to a target position corresponding to the inputted target position data TPD, a first acquiring section that provisionally acquires first reference position data $a_j$ which is outputted from the detection section when the operation piece is placed at a first reference position, and that provisionally acquires second reference position data $a_{j+1}$ which is outputted from the detection section when the operation piece is placed at a second reference position, a second acquiring section that acquires first correct position data $b_j$ which is predetermined in correspondence to the first reference position and acquires second correct position data $b_{j+1}$ which is predetermined in correspondence to the second reference position, and that calculates a coefficient $D_j$ according to the following first equation $D_j=(a_{j+1}-a_j)/(b_{j+1}-b_j)$, and a converting section that operates when the target position data TPD falls between the first correct position data $b_j$ and the second correct position data $b_{j+1}$ for converting the target position data TPD according to the following second equation and outputting the converted target position data XPD effective to enable the drive section to accurately place the operation piece at the target position, where the second equation is presented by $XPD=a_j+D_j\times(TPD-b_j)$.

Preferably, the inventive operation apparatus further comprises a control section that controls the drive section to stop the operation piece when the detected position data outputted from the detection section coincides with the converted target position data XPD.

DETAILED DESCRIPTION OF THE INVENTION

Embodiments of the present invention will be described in further detail with reference to the accompanying drawings.

Figure 1:
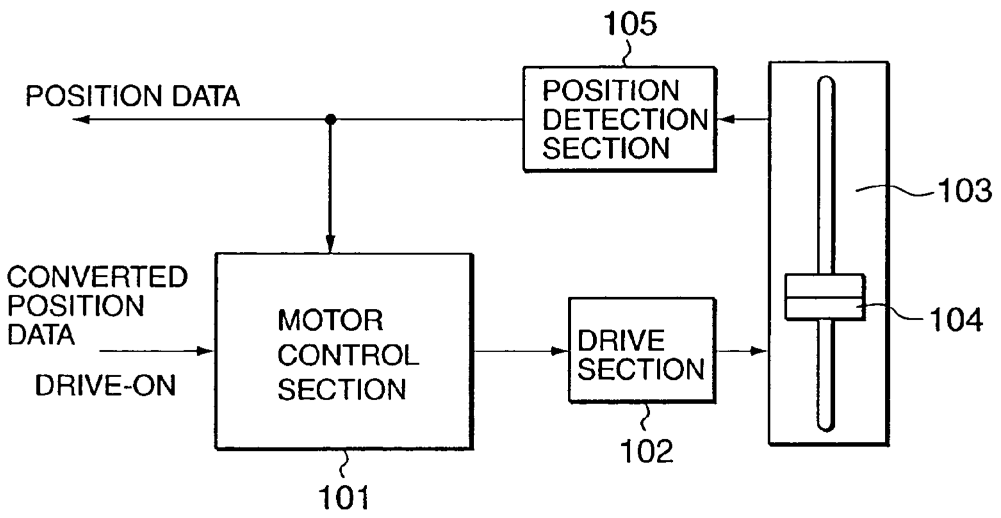
FIG. 1 is a block diagram of an electric fader according to an embodiment of the present invention.

FIG. 1 shows a block configuration of an electric fader according to an embodiment of the present invention. The fader may be mounted in an operating panel of a system such as digital audio mixer for dealing with operation information of the audio mixer system. The electric fader comprises a motor control section 101, a drive section 102, a fader section 103 having a motor-driven sliding piece 104, and a position detection section 105. The position detection section 105 includes an analog/digital (A/D) converter and is designed to be capable of A/D conversion in an entire range in which fader sliding pieces can move. When the sliding piece 104 of the fader section 103 is operated manually, the position detection section 105 detects a voltage value or a current value that changes linearly in accordance with positions of the sliding piece 104. The position detection section 105 uses the A/D converter to convert the voltage value or the current value into a digital value and outputs this value as position data. In this specification, a term "position linear data" is used to represent data that linearly varies on the scale of positions or angles of rotation (millimeters or radians) for operation devices. In addition, a term "decibel linear data" is used to represent data such as sound volume data that linearly varies on the decibel scale. In this specification, data termed "position data" in any combination is all position linear data. All the "attenuation factor data" signifies decibel linear data.

When an instruction from the CPU is used to move the sliding piece 104 to a specified position, the CPU supplies the motor control section 101 with converted position data (digital value) and a drive-on signal. The motor control section 101 generates a voltage value or a current value corresponding to the supplied converted position data, drives the sliding piece 104 using a motor, and moves the sliding piece 104 to a position corresponding to the converted position data. When the sliding piece 104 is moved, the position detection section 105 outputs position data corresponding to the position. The motor control section 101 moves the sliding piece 104 until position data from the position detection section 105 equals the converted position data. In this manner, the sliding piece 104 is aligned to the position corresponding to the converted position data.

As already mentioned in the prior art and the problems to be solved by the invention, the variable resistor of the fader section 103 is subject to variances of accuracy. Resistance changes are not always uniform with respect to sliding piece positions. There are also errors in the mounting position for the variable resistor of the fader section 103. Accordingly, the above-mentioned problems occur if the electric fader shown in FIG. 1 is used as is for a digital mixer. To avoid this, the present invention corrects position data output from the electric fader in FIG. 1 to an accurate value for use. A target position for the sliding piece is corrected and supplied as converted position data.

The principle of the present invention will now be described with reference to FIG. 5. The reference numeral 501 shows a state of actually mounting the fader section 103. There is provided a 100 mm movable range for the fader's sliding piece. A range of approximately 1 mm at the top and the bottom of the movable range is not used for compensating a mounting error. A mechanical means may be provided to prevent the sliding piece from entering the range of approximately 1 mm at the top and the bottom. The range where the sliding piece can be positioned is marked with graduations such as ∞ dB, . . . , −20 dB, . . . , 0 dB, . . . , +10 dB.

Figure 5:
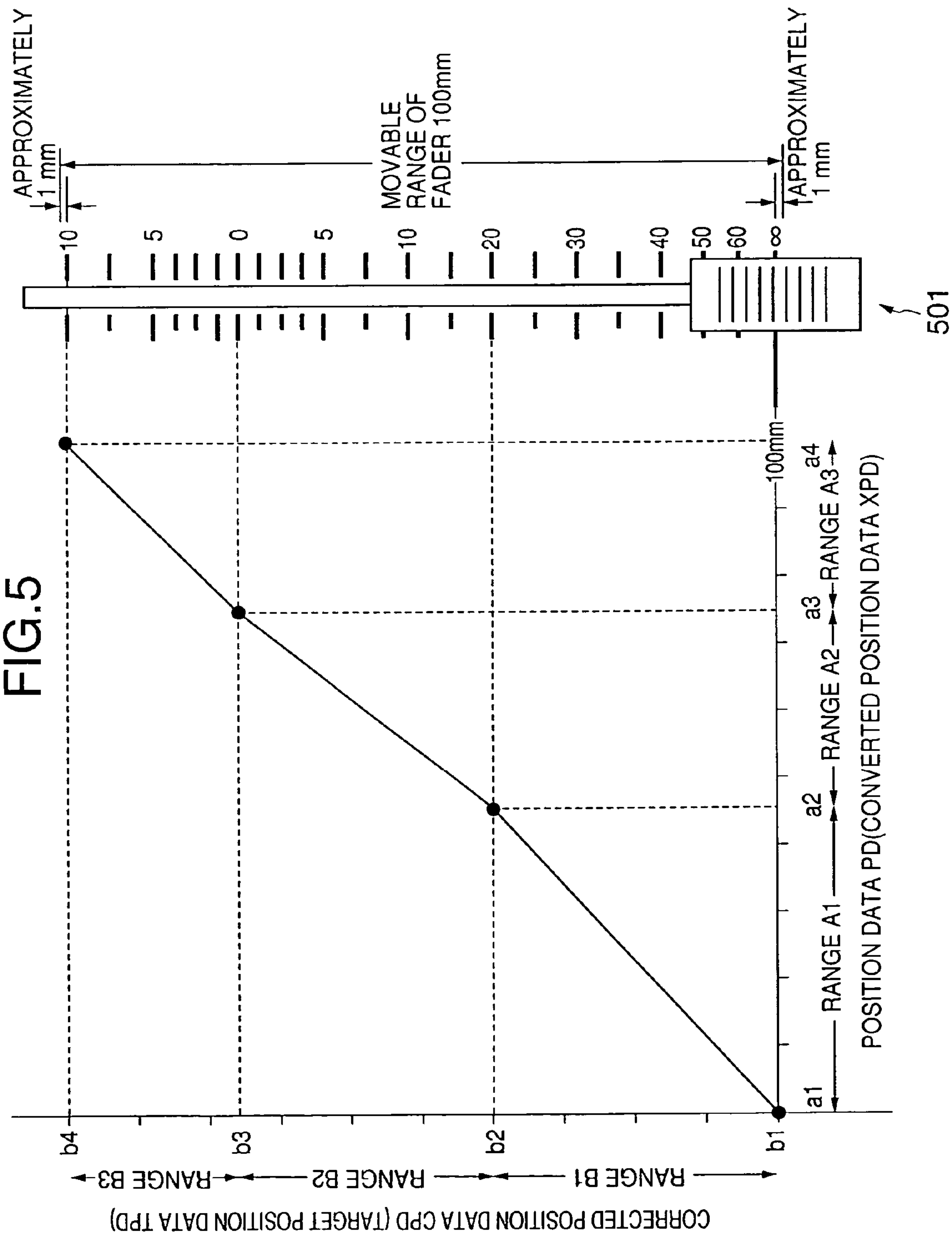
FIG. 5 shows the relationship among a fader's sliding piece position, detected position data, and corrected position data.

A graph on the left of FIG. 5 shows the relationship between position data PD and corrected position data CPD observed when the fader is manually operated to input operation information to the system, and shows the relationship between converted position data XPD and target position data TPD) observed when the fader is mechanically operated to input operation information from the system. The corrected position data CPD indicates accurate position data values the system CPU should receive as operation information in correspondence with the sliding piece's movable range marked with a scale of graduations −∞ dB through +10 dB. When the sliding pieces of all faders are positioned to −∞ dB despite various variances and errors, the CPU needs to receive b1, i.e., the corresponding accurate value as position data. Likewise, the CPU needs to receive b2, b3, and b4 when the sliding piece is positioned to −20 dB, 0 dB, and +10 dB, respectively. The position data PD indicates actual position data that is actually output from the electric fader as configured in FIG. 1. The position data contains a displacement due to various variances and errors. That is to say, adjusting the sliding pieces to the same position on different faders does not always output the same position data value.

According to the embodiment, a plurality of reference positions is provided beforehand in the movable range from −∞ dB to +10 dB for the fader's sliding piece. When the sliding piece is adjusted to the reference positions before the use of the fader, reference position data is output. A coefficient needs to be determined for an arithmetic equation that keeps correspondence between the obtained position data and the above-mentioned corrected position data. When the fader is used, the arithmetic equation is used to find the corrected position data from the output position data.

Specifically, four reference positions −∞ dB, +20 dB, 0 dB, and +10 dB are specified in the sliding piece's movable range from −∞ dB to +10 dB. When the sliding piece is adjusted to these positions before the use of the fader, reference position data is output. It is assumed that the reference position data is output as al for −∞ dB, a2 for −20 db, a3 for 0 dB, and a4 for +10 dB. It should be noted that values for al through a4 vary with the respective faders due to various variances and errors of the faders. The reference position data obtained in this manner corresponds to position data PD indicated as al through a4 in FIG. 5.

An arithmetic equation coefficient needs to be found so that correct position data b1, b2, b3, and b4 can be obtained when the position data PD is a1, a2, a3, and a4, respectively, and so that an interval between the values can be interpolated according to the graph shown in FIG. 5. Specifically, it is necessary to find coefficient $C_i$ of the following Equation 1 for range $A_i$(i=1, 2, and 3) in FIG. 5.

$$\text{Coefficient } C_i=(b_{i+1}-b_i)/(a_{i+1}-a_i) \quad \text{(Equation 1)}$$

When the fader is used, the following Equation 2 is used to find the corrected position data CPD depending on which range $A_i$ contains the position data PD output from the electric fader in FIG. 1.

$$CPD=b_i+C_i\times(PD-a_i) \quad \text{(Equation 2)}$$

In this manner, the corrected position data is obtained by correcting the position data detected from the position detection section 105. The final mixing process requires an attenuation factor, not a position. The obtained corrected position data CPD is converted into attenuation factor data AD and is stored in the current memory. That is to say, the attenuation factor data AD is converted into a value equivalent to attenuation factors −∞ dB (minimum value min), −20 dB, 0 dB, and +10 dB when the corrected position data CPD is b1, b2, b3, and b4, respectively. The mixer CPU supplies the DSP with the attenuation factor data AD obtained in this manner for executing various mixing processes. Generally, an error is contained in the least significant bit of the fader position data. Accordingly, the resolution (the number of bits) of the corrected position data needs to be less than or equal to that of the original position data. The attenuation factor data AD uses more bits than the corrected position data so as to provide a higher resolution than the corrected position data for fine graduations (−5 dB to +5 dB) on the fader. This is because the fader's position resolution can be maximized.

When the system CPU electrically drives the sliding piece to move to a target position corresponding to an intended attenuation factor, it just needs to perform an operation reverse to the above-mentioned correction of the position data. At the time When finding coefficient $C_i$ in the above-mentioned Equation 1, it is also necessary to find coefficient $D_j$ in the following Equation 3 for each range $B_j$(j=1, 2, and 3) at the same time.

$$\text{Coefficient } D_j=(a_{j+1}-a_j)/(b_{j+1}-b_j) \quad \text{(Equation 3)}$$

When a targeted attenuation factor data is supplied to a control section of the fader, the CPU first converts the target attenuation factor data into target position data TPD that indicates a target position as a movement destination. The following Equation 4 is used to find converted position data XPD depending on the range $B_j$ containing the target position data TPD.

$$XPD=a_j+D_j\times(TPD-b_j) \quad \text{(Equation 4)}$$

When the motor control section 101 in FIG. 1 is supplied with the resultant converted position data XPD and the drive-on signal, the sliding piece is moved to a proper position corresponding to the attenuation factor.

Figure 2:
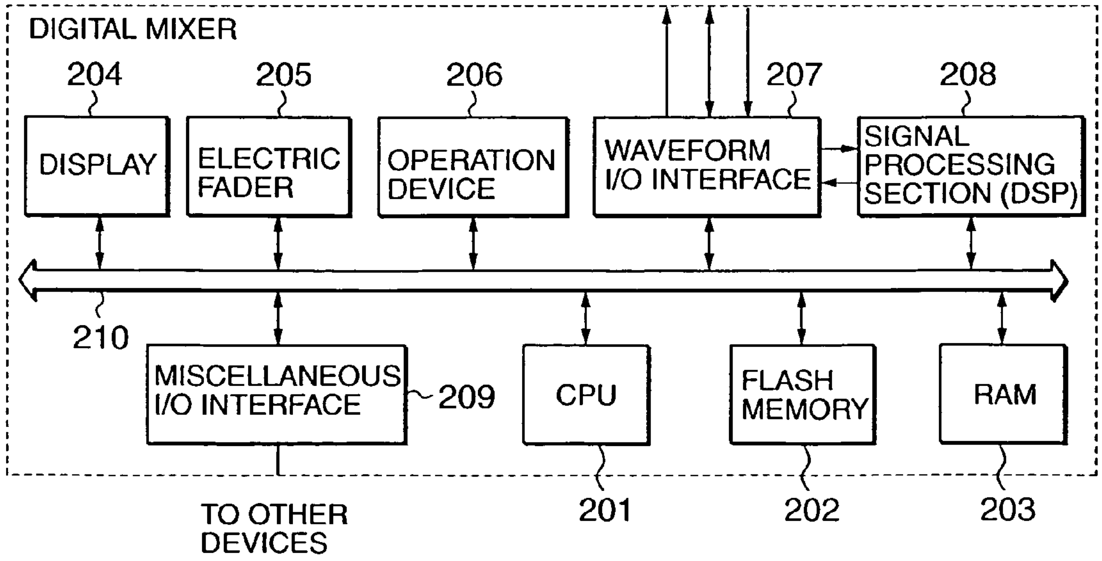
FIG. 2 is a block diagram of a digital mixer according to the embodiment.

FIG. 2 shows a block configuration of the digital mixer system that detects and controls positions of the faders based on the principle as described in FIG. 5. The digital mixer system comprises a central processing unit (CPU) 201, flash memory 202, RAM (random access memory) 203, a display 204, an electric fader 205, an operation device 206, a waveform I/O interface 207, a signal processing section (DSP) 208, a miscellaneous I/O interface 209, and a system bus 210.

The CPU 201 is a processor to control the entire operation of the mixer. The flash memory 202 is nonvolatile memory that stores various programs executed by the CPU 201 and various data used by the CPU 201. The RAM 203 is volatile memory used as a load area or a work area for programs executed by the CPU 201. The display 204 displays various information provided on an external panel of the mixer. The electric fader 205 is a kind of an operation device for setting various parameters provided on an operation panel and has the configuration as shown in FIG. 1. The other operation device 206 is provided on the operation panel and is also operated by a user. The waveform I/O 207 is an interface with external devices for exchanging waveform signals. The DSP 208 executes various microprograms based on instructions from the CPU 201 to mix waveform signals input via the waveform I/O 207, provide effects, and control sound volume levels. The DSP 208 outputs the processed waveform signal via the waveform I/O 207. The miscellaneous I/O 209 is an interface for connecting the other devices.

Figure 3A:
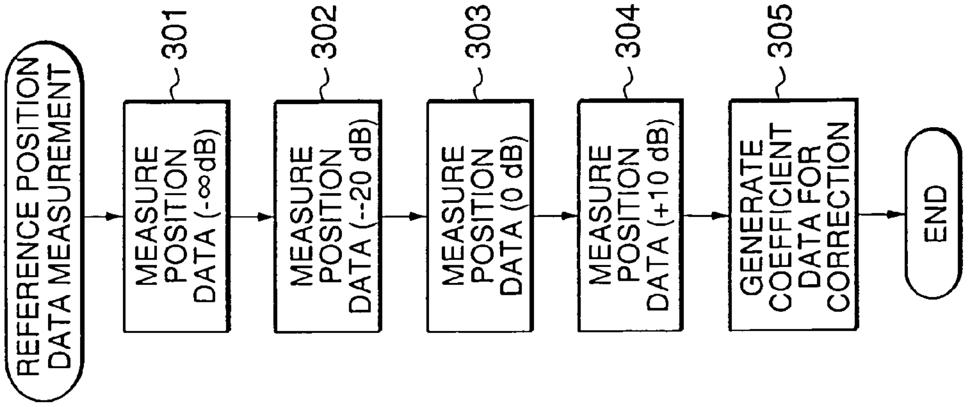
FIGS. 3(*a*) through 3(*c*) show flowcharts of routines for obtaining position data from faders and correcting the obtained position data.
Figure 3B:
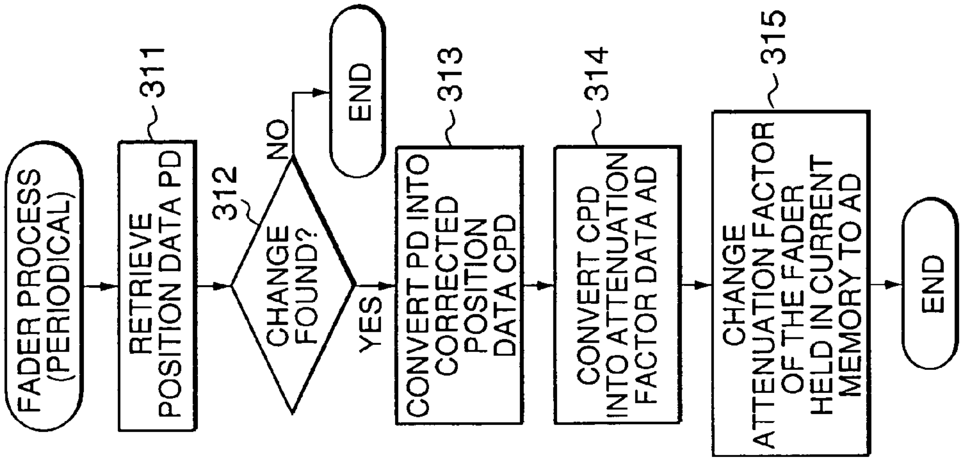
Figure 3C:
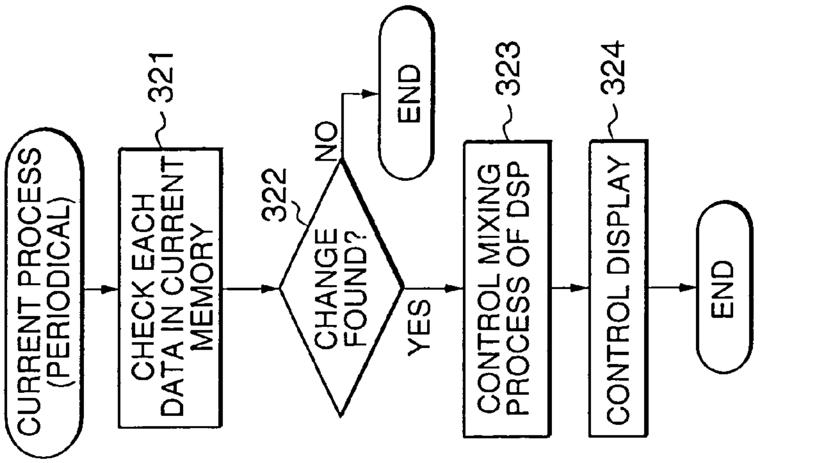

FIG. 3 shows flowcharts of routines that are executed by the mixer's CPU 201 in FIG. 2 to obtain and correct position data for the sliding piece 104 of the fader 103.

FIG. 3(*a*) is an reference position data measuring flowchart to be performed as preprocessing for using the fader. This process is performed for calibration of the mounted faders according to job instructions after a mixer is assembled at the factory or after a mixer is repaired at the service center, for example. At step 301, the display 204 or the communication I/O 209 is used to issue an instruction to a person or an external calibration device for adjusting the fader to −∞ dB. When the sliding piece 104 of the fader 103 is moved to the graduation position for attenuation factor −∞ dB by means of a person's hand, a calibration device's arm, or the like in accordance with the instruction, the corresponding reference position data al (FIG. 5) is measured. Likewise, at steps 302, 303, and 304, the sliding piece 104 is moved to the graduation positions for attenuation factors −20 dB, −0 dB, and +10 dB to measure the corresponding reference position data a2, a3, and a4. At step 305, as shown in FIG. 5, the above-mentioned (Equation 1) is used to find coefficient data $C_i$ for correction corresponding to range $A_i$(i=1, 2, and 3). Also at step 305, as shown in FIG. 5, the above-mentioned (Equation 3) is used to find coefficient $D_i$ corresponding to range $B_j$(j=1, 2, and 3).

FIG. 3(*b*) is a fader processing flowchart that is periodically performed for each fader. At step 311, position data PD is retrieved from the position detection section 105 corresponding to the fader. At step 312, it is determined whether or not the position data PD is changed. It is assumed that a value of the previous position data PD is stored. When no change is found, the process terminates. When a change is found, the current position data PD is converted into corrected position data CPD at step 313. The above-mentioned (Equation 1) is used for this conversion depending on which range $A_i$ contains the position data PD. At step 314, the corrected position data CPD is converted into attenuation factor data AD. At step 315, the attenuation factor for the fader in the current memory is changed to the found attenuation factor data AD.

FIG. 3(*c*) is a flowchart showing a current process that is performed periodically. At step 321, each data in the current memory is checked. At step 322, it is determined whether or not data in the current memory is changed. It is assumed that each value of the previous current memory is stored. When no change is found, the process terminates. Where a change is found, the DSP 208 is controlled for its mixing process depending on a value of the changed data at step 323. When a fader is operated to change the attenuation factor, for example, the current memory will store, as its attenuation factor, the attenuation factor for a musical sound signal on a channel corresponding to the fader. At step 324, the display 204 is controlled so as to display the change. The process then terminates.

Figure 4A:
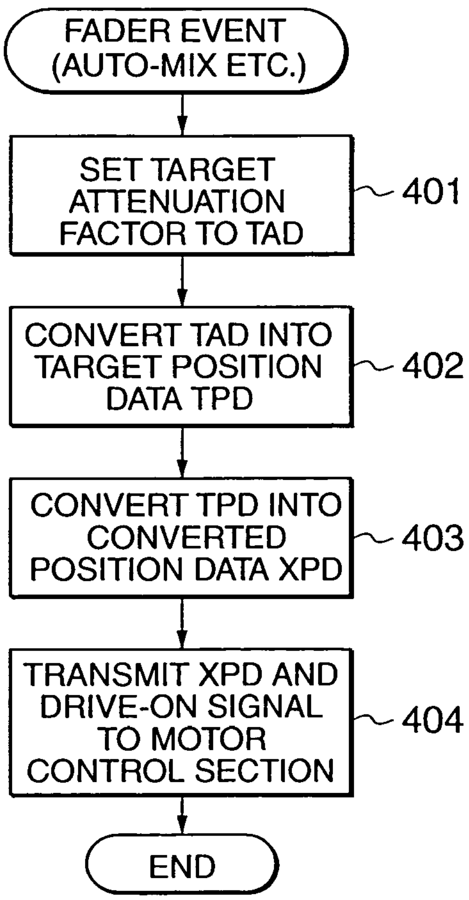
FIGS. 4(*a*) and 4(*b*) show flowcharts of routines for driving faders.
Figure 4B:
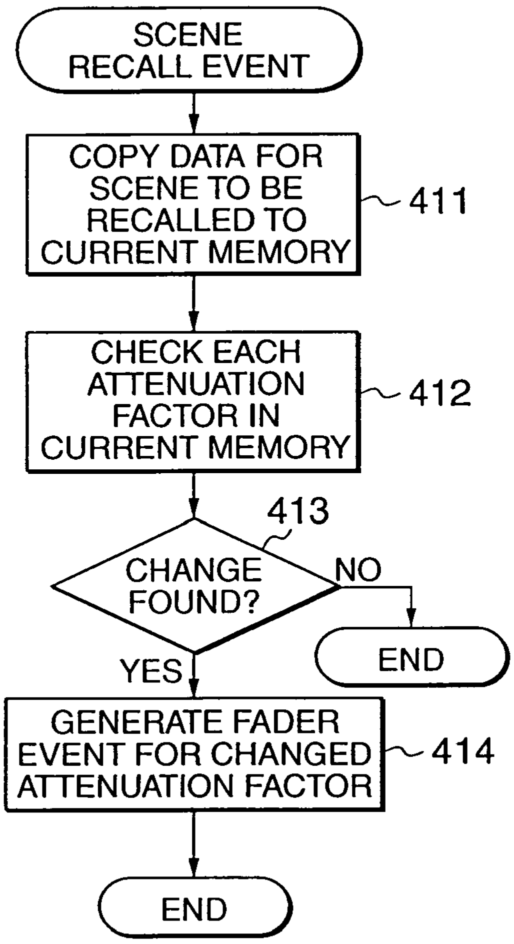

FIG. 4 shows flowcharts of processes executed by the CPU 201 for moving the sliding piece 104 of the fader 103 to a specified position.

FIG. 4(*a*) shows a process of issuing a fader event from the auto-mix function, for example. The auto-mix function provides fully automatic mixing operations. First, the auto-mix function issues a recording instruction to give time stamps to events indicating the contents of operations that are sequentially performed in accordance with the mixer. The time stamp indicates the timing of each event. A sequence of events provided with time stamps is recorded as auto-mix data. Thereafter, the auto-mix function issues a reproduction instruction to reproduce the operations sequentially performed in accordance with the mixer based on the recorded auto-mix data. During the auto-mix reproduction, each event is issued at the timing indicated by the time stamp given to the event contained in the auto-mix data. A fader event is one of events recorded by the auto-mix function and indicates an attenuation factor corresponding to the position to which the fader is moved during auto-mix recording. When the fader event is issued during auto-mix reproduction, the attenuation factor indicated by the fader event is assumed to be the target attenuation factor. The fader's sliding piece is automatically moved to the position of the target attenuation factor. The fader process in FIG. 3(*b*) converts the position of the fader's moved sliding piece into attenuation factor data which is then written to the current memory. The current process in FIG. 3(*c*) provides a mixing process with the attenuation factor data written to the current memory.

At step 401, the fader event process defines a target attenuation factor to be TAD. At step 402, the process converts the target attenuation factor TAD into target position data TPD. At step 403, the process converts the target position data TPD into converted position data XPD. The above-mentioned (Equation 4) is used for this conversion depending on which range $B_i$ contains the target position data TPD. At step 404, the process transmits the converted data XPD and the drive-on signal to the motor control section 101, and then terminates. At step 401 above, it may be preferable to directly (without intermediation of the fader process in FIG. 3(*b*)) write the attenuation factor data indicated by the fader event to the current memory.

FIG. 4(*b*) is a flowchart showing a scene recall event process that is performed when an operator selects one of scenes stored in the scene memory and performs a scene recall operation. When each scene is stored, data in the current memory indicates mixing setup states of the mixer. The scene memory records a plurality of scenes that are snapshots of the data in the current memory. At step 411, the process copies data for a scene to be recalled to the current memory. The current process in FIG. 3(*c*) above provides the mixing process with the data written to the current memory. At step 412, the process checks each attenuation factor in the current memory. When a change is found at step 413, the process advances to step 414. The process uses the changed attenuation factor as a target attenuation factor to generate a fader event, and then terminates. When no change is found at step 413, the process terminates.

As mentioned above, when mixers are manufactured in a factory, for example, it is necessary to measure reference position data for all faders as shown in FIG. 3(*a*) and find and store coefficients $C_i$ and $D_j$. In this case, it is a good practice to use a tool for aligning a plurality of faders to a target reference position at a time and concurrently measure reference position data and compute coefficients rather than aligning sliding pieces of individual faders to the reference position for measurement by means of human hands or machine arms. For this purpose, it may be preferable to provide part of the mixer panel with a projection or a dent for alignment of the tool.

When a mixer is repaired, one or several faders are replaced. To measure reference position data in this case, it may be preferable to electrically move sliding pieces of all faders to the reference positions, manually adjust misaligned sliding pieces to the reference positions, and then detect reference position data of the replaced fader with this state. In this manner, it is possible to confirm reference positions of the other faders and manually move the replaced fader to the reference position. Further, it may be also preferable to be able to adjust reference positions of the unreplaced faders.

While the above-mentioned embodiment uses the variable resistor to detect fader positions, the present invention may be applied to the other elements such as a rotary encoder to detect fader positions.

The A/D converter in the position detection section is designed to be able to A/D convert the entire movable range of faders and ensure a margin of 1 mm. This margin is not limited to 1 mm, i.e., 1% of the movable range 100, but may be changed to approximately 0.2% to 2% depending on the fader performance and the like.

The present invention corrects data values detected from faders at the stage of position-linear position data, not after converting position data into decibel-linear attenuation factor data. This makes the correction process efficient and simple and improves the mixer response. If the accuracy is unchanged, the index data for correction needs the smaller number of bits than that for the correction at the decibel-linear stage.

While the above-mentioned embodiment calculates coefficient C or D for correction before measuring reference position data, it may be preferable to calculate the coefficient at any point until position data is corrected. However, calculating the coefficient beforehand saves the time for the correction process, making it advantageous to the response. It is also possible to arithmetically modify the equations Equation 1 through Equation 4 for substantially the same calculation. In this case, a coefficient in the modified equation may differ from that described in the above-mentioned embodiment.

The above-mentioned embodiment corrects position data for the fader using characteristics of the linear interpolation between four measurement points as shown in FIG. 5. Further, it may be preferable to correct the position data using characteristics of curve interpolations such as the Lagrangian interpolation and the spline interpolation instead of the linear interpolation. In such case, coefficients used for the correction calculations depend on the respective calculation systems. When the spline interpolation is used, for example, the 3D spline interpolation can be used to find an equation for a curve crossing the four points in FIG. 5. This equation can be used for conversion from position data into corrected position data or conversion from target position data into converted position data.

While the above-mentioned embodiment corrects position data for the faders based on values of the four measurement points, the correction may use a plurality of measurement points more or fewer than four. For example, it is possible to use three points −∞ dB, 0 dB, and +10 dB or five points −∞ dB, −30 dB, −10 dB, 0 dB, and +10 dB.

As mentioned above, the present invention provisionally obtains reference position data that can be generated by aligning the sliding piece of an operation device such as the fader to a specified reference position. When the operation device is actually used, actual position data is corrected based on the reference position data and is output as corrected position data. Therefore, it is possible to acquire accurate corrected position data corresponding to scale graduations of the operation devices despite variances of accuracies and mounting positions.

There is provided target position data to indicate a target position to which the sliding piece should be moved. This target position data is converted based on the reference position data to generate converted position data. The converted position data is supplied to the drive section of the operation device to drive it. In this manner, the operation device's sliding piece can be electrically moved to the accurate target position corresponding to the graduation. When replacing operation devices, it is unnecessary to select a suitable operation device conforming to characteristics of the other operation devices or to precisely align an operation device to the mounting position.

What is claimed is:

1. An operation apparatus for use with a system to deal with operation information of the system, comprising:

an operation piece manually operable to move in a linear or circular direction to a position indicative of the operation information;

a detection section that detects the position of the operation piece and outputs position data corresponding to the detected position;

an acquiring section that provisionally acquires a plurality of reference position data which are outputted from the detection section when the operation piece is placed at a plurality of reference positions such that the respective reference position data correspond to the respective reference positions; and a correcting section that corrects the position data outputted from the detection section according to the provisionally acquired reference position data and outputs the corrected position data to the system.

2. An operation apparatus for use with a system to deal with operation information of the system, comprising:

an operation piece manually operable to move in a linear or circular direction to a position indicative of the operation information;

a detection section that detects the position of the operation piece and outputs position data PD corresponding to the detected position;

a first acquiring section that provisionally acquires first reference position data $a_i$ which is outputted from the detection section when the operation piece is placed at a first reference position, and that provisionally acquires second reference position data $a_{i+1}$ which is outputted from the detection section when the operation piece is placed at a second reference position;

a second acquiring section that acquires first correct position data $b_i$ which is predetermined in correspondence to the first reference position and acquires second correct position data $b_{i+1}$ which is predetermined in correspondence to the second reference position, and that calculates a coefficient $C_i$ according to the following first equation $C_i=(b_{i+1}-b_i)/(a_{i+1}-a_i)$; and a correcting section that operates when the position data PD falls between the first reference position data $a_i$ and the second reference position data $a_{i+1}$ for correcting the position data PD outputted from the detection section according to the following second equation and outputting the corrected position data CPD to the system, where the second equation is $CPD=b_i+C_i\times(PD-a_i)$.

3. An operation apparatus for use with a system to deal with operation information of the system, comprising:

an operation piece manually operable to move in a linear or circular direction to a position indicative of the operation information;

a detection section that detects the position of the operation piece and outputs position data corresponding to the detected position;

a drive section responsive to target position data inputted from the system to automatically move the operation piece to a target position corresponding to the inputted target position data;

an acquiring section that provisionally acquires a plurality of reference position data which are outputted from the detection section when the operation piece is placed at a plurality of reference positions such that the respective reference position data correspond to the respective reference positions; and a converting section that converts the target position data inputted from the system according to the respective reference position data, and outputs the converted target position data effective to enable the drive section to accurately place the operation piece at the target position.

4. The operation apparatus according to claim 3, further comprising a control section that controls the drive section to stop the operation piece when the detected position data outputted from the detection section coincides with the converted target position data.

5. An operation apparatus for use with a system to deal with operation information of the system, comprising:

an operation piece manually operable to move in a linear or circular direction to a position indicative of the operation information;

a detection section that detects the position of the operation piece and outputs position data corresponding to the detected position;

a drive section responsive to target position data TPD inputted from the system to automatically move the operation piece to a target position corresponding to the inputted target position data TPD;

a first acquiring section that provisionally acquires first reference position data $a_j$ which is outputted from the detection section when the operation piece is placed at a first reference position, and that provisionally acquires second reference position data $a_{j+1}$ which is outputted from the detection section when the operation piece is placed at a second reference position;

a second acquiring section that acquires first correct position data $b_j$ which is predetermined in correspondence to the first reference position and acquires second correct position data $b_{j+1}$ which is predetermined in correspondence to the second reference position, and that calculates a coefficient $D_j$ according to the following first equation $D_j=(a_{j+1}-a_j)/(b_{j+1}-b_j)$; and a converting section that operates when the target position data TPD falls between the first correct position data $b_j$ and the second correct position data $b_{j+1}$ for converting the target position data TPD according to the following second equation and outputting the converted target position data XPD effective to enable the drive section to accurately place the operation piece at the target position, where the second equation is presented by $XPD=a_j+D_j\times(TPD-b_j)$.

6. The operation apparatus according to claim 5, further comprising a control section that controls the drive section to stop the operation piece when the detected position data outputted from the detection section coincides with the converted target position data XPD.

7. The operation apparatus according to claim 1, wherein the operation piece is manually operable along a predetermined movable range between opposite ends, and the acquiring section acquires a plurality of reference position data which are outputted from the detection section when the operation piece is placed at a plurality of reference positions which include a pair of end reference positions located around the opposite ends of the movable range of the operation piece.

8. The operation apparatus according to claim 7, wherein the acquiring section acquires a pair of the reference position data when the operation piece is placed at the pair of the end reference positions which are located inside the respective ends of the movable range by a predetermined width.

9. The operation apparatus according to claim 8, wherein the acquiring section acquires a plurality of reference position data when the operation piece is placed at a plurality of reference positions which include at least one intermediate reference position located in the middle of the movable range in addition to the pair of the end reference positions.

10. The operation apparatus according to claim 1, wherein the operation piece is provided on an audio mixer system and manually operable to move in a linear or circular direction to a position indicative of the operation information for controlling a sound volume of the audio mixer system.

11. The operation apparatus according to claim 10, wherein the detection section detects the position of the operation piece and outputs the position data which corresponds to the detected position and which indicates a length or angle in a linear scale, and the correcting section corrects the position data outputted from the detection section and outputs the corrected position data in the linear scale, and wherein the operation apparatus further comprises: a converting section that converts the corrected position data in the linear scale to volume data in a decibel scale and outputs the volume data to the audio mixer system for controlling the sound volume in the decibel scale.

12. The operation apparatus according to claim 11, wherein the acquiring section acquires a plurality of reference position data which are outputted from the detection section when the operation piece is placed at a plurality of reference positions which includes a reference position corresponding to 0 dB of the sound volume.

13. The operation apparatus according to claim 12, wherein the acquiring section acquires a plurality of reference position data when the operation piece is place at a plurality of reference positions which includes another reference position corresponding to −20 dB of the sound volume.

14. The operation apparatus according to claim 1, wherein the detection section periodically detects the position of the operation piece and outputs the position data, and wherein the operation apparatus further comprises a determining section that determines if the position data outputted from the detection section is changed or not, and wherein the correcting section operates when the determining section determines that the position data is changed.

15. The operation apparatus according to claim 3, wherein the operation piece is manually operable along a predetermined movable range between opposite ends, and the acquiring section acquires a plurality of reference position data which are outputted from the detection section when the operation piece is placed at a plurality of reference positions which include a pair of end reference positions located around the opposite ends of the movable range of the operation piece.

16. The operation apparatus according to claim 15, wherein the acquiring section acquires a pair of the reference position data when the operation piece is placed at the pair of the end reference positions which are located inside the respective ends of the movable range by a predetermined width.

17. The operation apparatus according to claim 16, wherein the acquiring section acquires a plurality of reference position data when the operation piece is placed at a plurality of reference positions which include at least one intermediate reference position located in the middle of the movable range in addition to the pair of the end reference positions.

18. The operation apparatus according to claim 15, wherein the operation piece is provided on an audio mixer system and manually operable to move in a linear or circular direction to a position indicative of the operation information for controlling a sound volume of the audio mixer system.

19. The operation apparatus according to claim 18, wherein the detection section detects the position of the operation piece and outputs the position data which corresponds to the detected position and which indicates a length or angle in a linear scale, and the correcting section corrects the position data outputted from the detection section and outputs the corrected position data in the linear scale, and wherein the operation apparatus further comprises: a converting section that converts the corrected position data in the linear scale to volume data in a decibel scale and outputs the volume data to the audio mixer system for controlling the sound volume in the decibel scale.

20. The operation apparatus according to claim 19, wherein the acquiring section acquires a plurality of reference position data which are outputted from the detection section when the operation piece is placed at a plurality of reference positions which includes a reference position corresponding to 0 dB of the sound volume.

21. The operation apparatus according to claim 20, wherein the acquiring section acquires a plurality of reference position data when the operation piece is place at a plurality of reference positions which includes another reference position corresponding to −20 dB of the sound volume.

22. The operation apparatus according to claim 15, wherein the detection section periodically detects the position of the operation piece and outputs the position data, and wherein the operation apparatus further comprises a determining section that determines if the position data outputted from the detection section is changed or not, and wherein the correcting section operates when the determining section determines that the position data is changed.

* * * * *